United States Patent
Milton et al.

(10) Patent No.: US 10,089,367 B2
(45) Date of Patent: Oct. 2, 2018

(54) EXPEDITING PATTERN MATCHING QUERIES AGAINST TIME SERIES DATA

(71) Applicant: PlaceIQ, Inc., New York, NY (US)

(72) Inventors: Stephen Milton, Lyons, CO (US); Duncan McCall, Greenwhich, CT (US)

(73) Assignee: PlaceIQ, Inc., New York, NY (US)

( * ) Notice: Subject to any disclaimer, the term of this patent is extended or adjusted under 35 U.S.C. 154(b) by 369 days.

(21) Appl. No.: 15/086,378

(22) Filed: Mar. 31, 2016

(65) Prior Publication Data

US 2016/0210332 A1    Jul. 21, 2016

Related U.S. Application Data

(63) Continuation-in-part of application No. 15/009,053, filed on Jan. 28, 2016, now Pat. No. 9,483,498, and a
(Continued)

(51) Int. Cl.
*G06Q 10/10* (2012.01)
*G06F 17/30* (2006.01)
(Continued)

(52) U.S. Cl.
CPC ........ *G06F 17/3053* (2013.01); *G06F 9/5083* (2013.01); *G06F 17/30551* (2013.01);
(Continued)

(58) Field of Classification Search
USPC ........................................................ 709/205
See application file for complete search history.

(56) References Cited

U.S. PATENT DOCUMENTS

2009/0171999 A1    7/2009    Mccoll et al.
2013/0091266 A1    4/2013    Bhave et al.
(Continued)

OTHER PUBLICATIONS

'Activity Selection Problem', https://en.wikipedia.org/wiki/Activity_selection_problem, Oct. 9, 2015, pp. 1 to 4.
(Continued)

*Primary Examiner* — Vivek Srivastava
*Assistant Examiner* — Hien Doan
(74) *Attorney, Agent, or Firm* — Pillsbury Winthrop Shaw Pittman LLP

(57) ABSTRACT

Provided is a process including: obtaining activity profiles; for each activity profile, sorting the activity records in order of the timestamps; obtaining a query having a rule specifying criteria to select a subset of the individuals; and for each sorted activity profile: iterating through the sorted activity records in sorted order and at each iteration: determining whether the attribute of the geolocation of the respective activity record matches the activity of the activity pattern and, in response to determining a match: determining the activity pattern count; determining whether the activity pattern count satisfies the first condition and, in response to determining that the first condition is satisfied: initializing the activity pattern count; determining the quantifier count; and determining whether the quantifier count satisfies the second condition and, in response designating the individual corresponding to the respective sorted activity profile as responsive to the query.

20 Claims, 5 Drawing Sheets

Related U.S. Application Data continuation-in-part of application No. 14/886,841, filed on Oct. 19, 2015, said application No. 15/009,053 is a continuation of application No. 13/918,576, filed on Jun. 14, 2013, now Pat. No. 9,275,114, and a continuation of application No. 13/734,674, filed on Jan. 4, 2013, now Pat. No. 8,489,596.

(60) Provisional application No. 62/142,302, filed on Apr. 2, 2015, provisional application No. 62/066,100, filed on Oct. 20, 2014.

(51) Int. Cl.
*G06F 9/50* (2006.01)
*H04L 29/08* (2006.01)
*H04W 4/029* (2018.01)

(52) U.S. Cl.
CPC ............ *H04L 67/18* (2013.01); *H04L 67/22* (2013.01); *H04L 67/306* (2013.01); *H04W 4/029* (2018.02)

(56) References Cited

U.S. PATENT DOCUMENTS

| | | |
|---|---|---|
| 2014/0195530 A1 | 7/2014 | Milton et al. |
| 2014/0214763 A1 | 7/2014 | Haas et al. |
| 2015/0149091 A1 | 5/2015 | Milton et al. |
| 2015/0324439 A1 | 11/2015 | Bhave et al. |
| 2015/0339312 A1 | 11/2015 | Lin et al. |

OTHER PUBLICATIONS

'Backtracking', https://en.wikipedia.org/wiki/Backtracking, Mar. 16, 2016, pp. 1 to 5.

'Guarded Commands, Non-Determinacy and Formal Derivation of Programs', Communications of the ACM, vol. 18, Issue 8, Aug. 1975, pp. 1-15.

'Regular Expression' https://en.wikipedia.org/wiki/Regular_expression, Mar. 24, 2016, pp. 1 to 26.

'Thompson's Construction', https://en.wikipedia.org/wiki/Thompson%27s_construction, Jan. 26, 2016, pp. 1 to 8.

EXPEDITING PATTERN MATCHING QUERIES AGAINST TIME SERIES DATA

CROSS-REFERENCE TO RELATED APPLICATIONS

This patent claims the benefit of U.S. Provisional Patent Application 62/142,302, titled "Location-Based Analytic Platform Query Languages," filed 2 Apr. 2015; is a continuation-in-part of U.S. patent application Ser. No. 14/886,841, titled "SCRIPTING DISTRIBUTED, PARALLEL PROGRAMS, filed 19 Oct. 2015, which claims the benefit of U.S. Provisional Patent Application 62/066,100, titled "Scripting Distributed, Parallel Programs," filed 20 Oct. 2014; is a continuation-in-part of U.S. patent application Ser. No. 15/009,053, titled "APPARATUS AND METHOD FOR PROFILING USERS," filed 28 Jan. 2016, which is a continuation of U.S. Pat. No. 9,275,114, having the same title and filed 14 Jun. 2013, which is a continuation of U.S. Pat. No. 8,489,596, having the same title and filed 4 Jan. 2013. The entire content of each of these earlier-filed applications is hereby incorporated by reference for all purposes.

BACKGROUND

1. Field

The present invention relates generally to data analysis, and more specifically, to expediting queries specifying patterns that unfold over time.

2. Description of the Related Art

Geolocation analytics platforms are generally used to understand human behavior. Such systems map data about places to geographic locations and then this mapping is used to analyze patterns in human behavior based on people's presence in those geographic locations. For example, researchers may use such systems to understand patterns in health, educational, crime, or political outcomes in geographic areas. And some companies use such systems to understand the nature of their physical locations, analyzing, for instance, the demographics of customers who visit their stores, restaurants, or other facilities. Some companies use such systems to measure and understand the results of TV advertising campaigns, detecting changes in the types of customers who visit stores following a campaign. Some companies use geolocation analytics platforms to target content to geolocations, e.g., selecting content like business listings, advertisements, billboards, mailings, restaurant reviews, and the like, based on human behavior associated with locations to which the content is directed. In many contexts, location can be a useful indicator of human behavior.

It is increasingly common for geolocation analytics platforms to contain large data sets, as often arise in the context of analyzing web-scale data sets describing user behavior on a network. In some cases, relatively rich location histories of individual users are obtained based on mobile device usage indicating 1) places the user visits; and 2) attributes of the places the users visit at the time of the visit. In many cases, the number of users for which such data is obtained is relatively large, e.g., well over one million users.

Certain types of queries for users profiles in (or based on) geolocation analytics platforms do not scale well. Typically, user profiles contain records of activities that unfold over time, and some queries specify temporal patterns in those activities. Often queries that are very intuitive for a human to understand can become computationally infeasible when applied to a large data set, e.g., queries for certain patterns in a user's behavior constitute a combinatorial optimization problem that scales poorly as 1) the number of user profiles at issue increase; 2) the number of activities recorded in each profile increase; and 3) the number of criteria in the query increase.

SUMMARY

The following is a non-exhaustive listing of some aspects of the present techniques. These and other aspects are described in the following disclosure.

Some aspects include a process including: obtaining activity profiles; for each activity profile, sorting the activity records in order of the timestamps; obtaining a query having a rule specifying criteria to select a subset of the individuals; and for each sorted activity profile: iterating through the sorted activity records in sorted order and at each iteration: determining whether the attribute of the geolocation of the respective activity record matches the activity of the activity pattern and, in response to determining a match: determining the activity pattern count; determining whether the activity pattern count satisfies the first condition and, in response to determining that the first condition is satisfied: initializing the activity pattern count; determining the quantifier count; and determining whether the quantifier count satisfies the second condition and, in response designating the individual corresponding to the respective sorted activity profile as responsive to the query.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
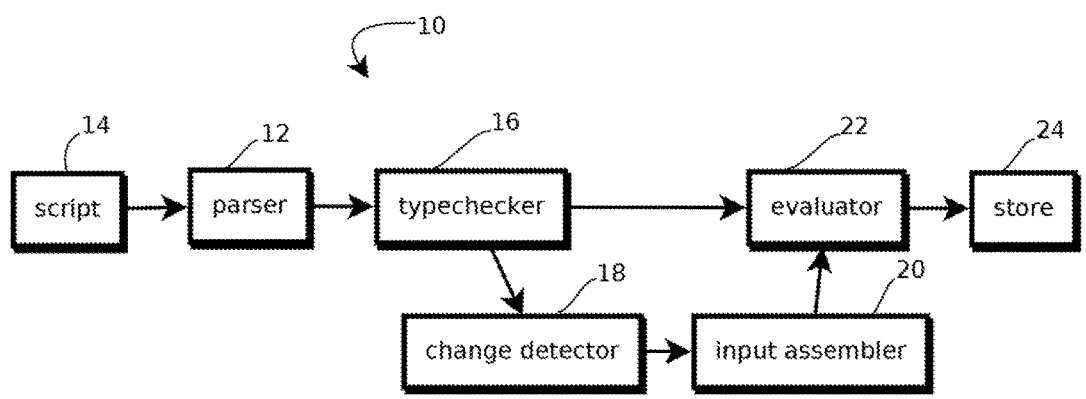
FIG. 1 is a block diagram of an example logical architecture of a system in accordance with the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of geolocation data analytics. Indeed, the inventors wish to emphasize the difficulty of recognizing those problems that are nascent and will become much more apparent in the future should trends in industry continue as the inventors expect. The inventors also wish to emphasize that certain techniques described below required insights that span multiple disciplines that often do not interact, including data analytics, computer science, and query optimization. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments of the present inventions are expected to expand the range of users who can use distributed, parallel algorithms, like MapReduce. Some embodiments may allow users to express an analysis and, then, automatically (which is not to suggest that all steps must be automatic in all embodiments, or that manual steps may not occur between automatic performance of each of the following steps): 1) determine which data is implicated (e.g., referenced in an equation directly or needed to calculate a value referenced in an equation); 2) determine if that data is already present in local memory of nodes in a compute cluster, and if not retrieve and distribute the data according to an index that keeps neighbors (for purposes of the analysis, e.g., values having similar, such as sequential, keys in the index) on the same nodes; 3) determine which nodes have data relevant to which rules in the analysis and send the relevant rules to the right nodes; and 4) aggregate results. Further, some embodiments may compose a mapper program and a reducer program based on the user's expression of the analysis to be performed, thereby shielding the user from the complexity of using or (i.e., and/or) optimizing MapReduce routines.

Further, embodiments are not limited to MapReduce implementations. The present techniques are generally applicable to data analysis with distributed parallel algorithms. Some examples include the following: Apache Spark, Dense Linear Algebra, Sparse Linear Algebra, Spectral Methods, N-Body Methods, Structured Grids, Unstructured Grids, Combinational Logic, Graph Traversal, Dynamic Programming, Backtrack and Branch-and-Bound, Graphical Models, Finite State Machines, and Dryad. Generally, some embodiments provide for a process that includes: A) Representing relationships among multiple data sets in a script based language as a mathematical/vector equation; B) Parallelizing the processing of the data to speed up the calculations on very large data sets; C) Representing the results as a set of results—defined by (e.g., indexed according to key values of) the specific dimensions desired to segment the data (e.g., location and time); D) Calculating the statistical nature of the resultant data across the output set (e.g., the information efficiency, mean etc.). Further, variants include applying these techniques by splitting the processing into a phase of assembling only the subset of data required for the calculation and then processing.

FIG. 1 shows an example logical architecture, in the form of a functional block diagram, of a system 10 operative to mitigate some of the issues with conventional systems discussed above. In some cases, the blocks may correspond to functionality implemented in code executing on one or more computers, such as those described below.

The illustrated embodiment includes a parser 12 configured to parse scripts 14 (e.g., textual scripting-language inputs) composed by business analysts or other users with a similar level of expertise in computer science. Examples of such scripts are presented below.

In some embodiments, the parser 12 may, in some embodiments, detect reserved terms and other patterns in characters encoding the scripts, such as other tokens in the scripts, and based on relative locations of such reserved tokens construct a parse tree or other data structure representing the input script. In some cases, the parser may also determine, e.g., with a recursive analysis of the detected tokens, whether the syntax of the input script adheres to scripting language rules and, in response to detecting a syntax error, output an indication of a syntax error. In some cases, the parser 12 may then determine which computing routines to execute with which input parameters based on the input script and either initiate those routines in a sequence indicated by the input script or encode instructions to imitate those routines in an intermediate language representation, such as in a bytecode representation for subsequent execution. In some cases, the parser 12 accepts as an input external definitions, such as ontologies and user-defined functions, such that reference to defined items may be detected by the parser 12 and the appropriate actions taken. In some cases, the parser 12 may output an abstract syntax tree (AST) that represents the structure of the input script with nodes corresponding to recognized tokens and values appearing in the script.

In some embodiments, the output of the parser 12, which in some cases may be a data structure representing the abstract syntactic structure of the input script, like an AST, may be input to a typechecker 16, which may be operative to recursively crawl the abstract syntax tree and apply rules that assign type to the various constructs, e.g., expressions, functions, variables, encoded in the input script and represented in the nodes of the tree. In some cases, the typechecker 16 may verify whether functions called by the script receive as parameters inputs of the appropriate type and, in response to detecting a discrepancy, output a type error.

In some embodiments, the AST, or other corresponding data structure representing the parsed script, is passed from the typechecker 16 to a change detection module 18. This module 18 may implement a set of optimizations that reduce computation time, input or output (IO) bandwidth usage, and memory consumption (which is not to imply that the output must be a global optimum, as optimization includes steps that reduce computing time, bandwidth use, or memory consumption without achieving globally optimal result, such as achieving the maximum optimization mathematically possible). For instance, in some embodiments, the change detector 18 may determine if the input script 14 implies any changes to the data currently distributed among nodes of a compute cluster (examples of which are described below with reference to a physical architecture of FIG. 2). In some cases, the typechecker 16 may identify data implicated by actions to be performed according to entries in the AST, e.g., data queried, acted upon, interrogated, or written to, and indications of this data (e.g., metadata indicating which records are relevant to which operations) may be sent to a change detector 18. The AST may then be passed to the evaluator 22.

In some cases, a previous analysis (which may include a stage of a larger analysis composed of a chain of sub-analyses) may have resulting in certain distributions of data among computing nodes of a compute cluster that executes the analysis. The current input script may operate on the same or a subset of that data, meaning that changes to the distribution of data are not needed (and in some cases that data may be deleted). The change detector 18 may compare the AST to a current inventory of data for each compute node and generate a list of which compute node is missing what data that will be used by the analyses expressed in the input script. For instance, embodiments may determine that the script references a particular key-value pair of an attribute (e.g., a value) of a geographic location at a particular time (e.g., a key) and, upon comparing that key-value pair to an inventory of which key-value pairs are resident on which nodes of a compute cluster, determine that certain nodes of the computer cluster will need the key-value pair to complete their portion of the analysis. Thus, the change detection module may, in some embodiments, 1) recursively crawl the AST; 2) at each node determine which key-value pairs in a data set to be analyzed are referenced by operations or values corresponding to the node; 3) determine whether the key-value pairs are present on a compute cluster node that will perform the operation or use the value. This is expected to reduce time-consuming transfers of large data sets across networks, causing the cluster to complete the analysis faster, which is not to suggest that all embodiments necessarily provide this benefit, as various techniques are described that are independently useful.

The output of the change detector 18, e.g., a list of which nodes need which key-value pairs to perform an analysis expressed by the input script, may be provided to the input-assembly module. Upon determining which nodes need which data (in contrast to code specifying operations to be performed on the data), the input-assembly module may pre-stage that data at the corresponding nodes. In some embodiments, the input-assembly module may cause those key-value pairs to be sent to those compute cluster nodes. Selectively distributing data is expected to reduce bandwidth and memory usage relative to systems that send a full data set to each node of the compute cluster, though not all embodiments use this technique, as other features described herein are independently useful. In some cases, the assembled data includes collections of adjacent (or proximate, e.g., within a threshold distance, time, or weighted combination of both) time tiles (as described below) and attributes of those time times relevant to an operation encoded in the AST, e.g., filtering according to an attribute or attribute scores above a threshold.

In some cases, the input-assembly module 20 may group and allocate key-value pairs to compute cluster nodes, such that values describing places or times near one another (e.g., adjacent, for geography, or sequential or on or near the same phases of a cycle, for time, or within some threshold distance or time) are placed on (e.g., in random access memory of, and in the address space of the operating system of) the same node. In some cases, the keys of key-value pairs encoding the data to be analyzed may be calculated to cause such a grouping. For instance, embodiments may determine that part of an analysis implicates geolocations adjacent a given geolocation (e.g., calculating a moving average of indicators of tourist activity over geographic space), and embodiments may calculate keys (for key-value pairs) that have similar values when referring to nearby geolocations.

For instance, some embodiments may operate on the time-tile records described in U.S. patent application Ser. No. 13/938,974, the entire contents of which are incorporated by reference for all purposes, and the described tile records (or portions thereof, such as certain attribute scores) may constitute values of key-value pairs in which the key corresponds to the tile and is named according to a space-filling curve, such as a Hilbert curve or a Morton curve that causes tiles near one another in geographic location or time to have similar keys (e.g., close to one another when the keys are listed in order, like numerical order, for instance within a threshold number of keys) in an index of key-value pairs. In some cases, the space filling curve may be a three or four dimensional curve that includes dimensions for height and time). In some cases, tile attributes (also called facets in some cases) may include attributes of places of interest, such as retail stores, defined by polygons overlaying groups of tiles. In some cases, the tiles overlapping a polygon may be identified in advance to expedite analyses, and those tiles may be indexed overlapping the polygon. In some cases, tiles partially overlapping a polygon may have the attributes of the polygon (e.g., store name, operating hours, or place of interest type, like sporting goods merchant, etc.) mapped to the tile in proportion to the amount of overlap, e.g., as an attribute in a time-tile record. Or in some cases, places of interest defined by polygons may serve as an atomic designation of place, though tiles are expected to facilitate faster data retrieval and operations some applications involving larger data sets, which is not to suggest that embodiments are limited to systems using tiles or that polygons are excluded. Additionally, or alternatively, data models may be built around other information to be analyzed, for instance, around various types of graphs describing people (e.g., user profiles in which attributes are mapped to users according to a user's path through tiles having those attributes), their interactions, relationships, interests, etc. In some cases, analyses may include identifying audiences and other inquiries described in U.S. patent application Ser. No. 14/667, 371, filed 24 Mar. 2015, and titled "LOCATION-BASED ANALYTIC PLATFORM AND METHODS," the entire contents of which are hereby incorporated by reference for all purposes.

In some cases, the input-assembly module may be operative to calculate such keys to attain a desired grouping of data and allocate data to compute nodes by contiguous ranges of keys, such that keys near one another in place or time are sent to the same compute nodes. In some cases, the input assembly module (also referred to as an input assembler) 20 is operative to crawl the AST and ascertain the appropriate dimension for grouping data, e.g., determining that an analysis implicates locations geographically near one another, temporarily near one another, or both, or near one another in some other vector space, and calculate the corresponding keys (e.g., group the keys or determine ranges of key values) that place those key-values near one another the key namespace. In some cases, thresholds for keys, durations, or distances to group data may be calculated based on the computing capacity of the nodes in the cluster.

Next, in some embodiments, an evaluator 22 may translate the AST into a MapReduce job (which can also be a job for one of the alternatives to MapReduce listed above). To this end, some embodiments may compose a map function and a reduce function and execute the job, e.g., with a Hadoop MapReduce implementation to yield an output, such as an immutable output text file. In some cases, the map function and reduce function instructions may be replicated and a copy sent to each of a plurality of compute nodes of a compute cluster. The map function may output a new set of key-value pairs based on a transformation of the input key-value pairs (in some cases outputting results in a new key name space), and those new key-value pairs may be sorted and distributed according to the new keys to compute nodes that run the reduce function. The reduce function may, in some cases, aggregate the received data (e.g., sum, multiply, average, etc.) and each return a portion of the output of the MapReduce job. In some cases, a job tracker may allocate computing tasks to the compute nodes, and a task tracker on each node may control the execution of tasks assigned to that node. In some cases, multiple MapReduce jobs may be chained to one another in sequence, with the output of one job serving as the input to the next. In some cases, such chaining may be specified by the script 14.

Results may be aggregated, e.g., reported back to a central computing device, and in some cases back to an analyst's computer. In some cases, results may be stored, and subsequent operations may be performed on the stored results. In some embodiments, the stored results may be stored on computing nodes of a computing cluster performing the presently described operations. Some embodiments may include a data store 24, which may be implemented as an immutable distributed file system running on the computing nodes of a cluster or other data structure, such as an in-memory relational database. In some cases, the results may include calculated attributes or selected sets of time tiles or people, such as those having some attribute selected in a previous operation. In some cases, subsequent operations encoded in the AST may be performed on the stored data, which in some cases may be distributed among the computing nodes of the cluster. In some cases, a record in the change detector 18 may be updated to reflect the location of the stored data, such that operations on that data may be routed to the nodes having the related stored data to reduce delays in compute time due to transferring relatively large data sets across networks.

A variety of different types of analyses may be composed by users with the present system, without those users necessarily being proficient in the various MapReduce implementations. Below are several examples of the types of scripts that users may compose to analyze a data set, such as the time-tile records described in U.S. patent application Ser. No. 13/938,974 or the user-profile records of U.S. patent application Ser. No. 13/734,674. In some cases, the input-assembly module may be operative to query the records implicated by a given script from these data sources and pre-position those records on the appropriate compute nodes to complete the analysis. Some embodiments may require certain statements, such as the illustrated example below, which requires that each statement must have a "yield" statement to indicate the output, but it should be understood that not all embodiments consistent with the present techniques impose such requirements.

EXAMPLE 1

---
Coverage Scoring Mode
---
rule "Autozone Customer" for Retail->Auto_Parts_Stores->Autozone {
    use coverage_scoring threshold 0.01 denominator Total->Location;
    use time_periods Mon-Fri 7:30-10:00, Sat 7-10, Sun 8-10;
    using taxonomy "piq->Location Tags->chain" {
        yield autozone;
    }
}
-- use (global scope) vs. using (local scope)
-- time periods can be human-readable or numeric or ISO8601
-- each rule must have exactly one yield statement
-- omission of time_periods defaults to all ---
Coverage Scoring Mode
---

In some cases, the script may include reserved terms, like "rule" "for" "use" and "yield" that are recognized by the parser and determine the structure of the AST. In some cases, the script may specify a MapReduce job that selects users who have visited a given retailer's geographic location (e.g., as indicated by overlaid polygons like those described above) during certain hours. In some embodiments, a yield command may assign a responsive data set to a variable that may be referenced in other operations on the results. In some embodiments, each rule must have one and only one yield statement, or other embodiments may have no yield statements or more than one yield statement. In some embodiments, a script may be a query that selects certain tiles, places of interest, time-tiles, or people satisfying criteria specified in the script. In some embodiments, the script may also be characterized as a query.

EXAMPLE 2

---
Ratio Scoring Mode
---
rule "Race" for Demographic->Race->. {
    use time_periods all except $am_biz_hours, $pm_biz_hours,
    $weekday_lunch;
    using taxonomy Census->Population->Race->Total {
        use ratio_scoring "White Alone" AS White,
            "Black Or African American Alone" AS "African
            American",
            "American Indian And Alaska Native Alone" AS
            "American Indian",
            "Asian Alone" AS Asian,
            "Native Hawaiian And Other Pacific Islander Alone"
            AS Hawaiian,
            "Two Or More Races" AS Mixed
        {
            yield White, "African American", "American Indian",
            Asian, Hawaiian, Mixed;
        }
    }
}
-- rule can yield multiple expressions
-- time periods can be specified subtractively

EXAMPLE 3

---
Score Summation Through Explicit Combination
---
rule "TV Viewership of A&E" for
TV_Viewership->Channel->A_and_E {
    use time_periods all except $am_biz_hours, $pm_biz_hours,
    $weekday_lunch;
    using taxonomy
    "RENTRAK->TV_Viewership->Channel->A_and_E" {
        combine AS combined_score {
            12AM > 8 => (12AM / 10.0) * 0.0515;
            1AM > 8 => (1AM / 10.0) * 0.0376;
            2AM > 8 => (2AM / 10.0) * 0.0296;
            3AM > 8 => (3AM / 10.0) * 0.0215;
            4AM > 8 => (4AM / 10.0) * 0.0183;
            5AM > 8 => (5AM / 10.0) * 0.0183;
            6AM > 8 => (6AM / 10.0) * 0.0255;
            7AM > 8 => (7AM / 10.0) * 0.0312;
            8AM > 8 => (8AM / 10.0) * 0.0317;
            9AM > 8 => (9AM / 10.0) * 0.0302;

-continued

| Score Summation Through Explicit Combination |
| --- |
| ```
            10AM > 8 => (10AM / 10.0) * 0.0306;
            11AM > 8 => (11AM / 10.0) * 0.0312;
            12PM > 8 => (12PM / 10.0) * 0.0322;
            1PM > 8 => (1PM / 10.0) * 0.0325;
            2PM > 8 => (2PM / 10.0) * 0.0331;
            3PM > 8 => (3PM / 10.0) * 0.034;
            4PM > 8 => (4PM / 10.0) * 0.0408;
            5PM > 8 => (5PM / 10.0) * 0.047;
            6PM > 8 => (6PM / 10.0) * 0.0521;
            7PM > 8 => (7PM / 10.0) * 0.0605;
            8PM > 8 => (8PM / 10.0) * 0.0731;
            9PM > 8 => (9PM / 10.0) * 0.0813;
            10PM > 8 => (10PM / 10.0) * 0.083;
            11PM > 8 => (11PM / 10.0) * 0.0731;
                yield combined_score;
        }
    }
}
-- multiple predicate can be simultaneously satisfied
``` |

EXAMPLE 4

| Time Periods and Macros |
| --- |
| ```
    define weekends_after_midnight Sat-Sun 0:00-2:00
    define weekday_overnight Mon-Fri. 0:00-6:00
    define weekend_early Sat-Sun 2:00-5:59
    define movie_showtime 2015-02-04T19:30/P3H22M
    define custom_periods 220, 180, 23, 1
    define LOW 0.3
    // e.g., first(piq->Location->...) = piq
    define first(x) prefix(x, 1)
``` |

In some cases, MapReduce processing may be performed with any of a variety of different implementations. For instance, some embodiments may perform such processing on a cluster of computers (e.g., in a data center or in a dedicated facility) with the Apache Hadoop implementation of MapReduce, using the Hadoop distributed file system (HDFS) for data storage. Such systems may mitigate certain issues with distributed algorithms, such as data integrity, which becomes increasing important as the number of computers in the cluster, and thus the number of potential sources of data loss in the event of a hardware or transmission failure, increase. To mitigate such issues, some embodiments may store data subject to the analysis in triplicate, with copies being present on three data nodes (or computers hosting the HDFS). That said, not all embodiments necessarily provide these benefits, as many of the present techniques are applicable to systems without redundant storage. Examples of Apache Hadoop MapReduce and HDFS implementation are described in the Apache MapReduce Tutorial and the Apache HDFS Architecture Guide, a copy of each of which is filed with U.S. Provisional Patent Application 62/066,100, filed 20 Oct. 2015, titled "Scripting Distributed, Parallel Programs." Patent Application 62/066,100, including the co-filed Apache MapReduce Tutorial and the Apache HDFS Architecture Guide, are incorporated by reference in its entirety.

In some embodiments, each compute node may persist data to a hard drive (or solid-state drive) after mapping or reducing, or to expedite processing, some embodiments may operate on data in memory (e.g., in dynamic random access memory in the address space of the operating system), in some cases without writing the data to a local hard drive. Access times on memory are often much faster than access times for storage, which is not to suggest that either technique is inconsistent with the present inventions. For instance, some embodiments may store data to hard disk to avoid reworking data in the event of a power failure or to process larger data sets than can be stored in memory concurrently on a given compute node in a cluster. In some cases, processes performing map operations or reduce operations may terminate upon completion of the operation, or some embodiments may maintain a persistent process that operates on data through multiple iterations of mapping and reducing (or their equivalent operations in other paradigms), for instance when data is stored in memory between operations to maintain the data in program state. Some embodiments may track the run-times for the various compute nodes on a given map or reduce task (or their analogs in other paradigms) and speculatively re-assign those tasks to other nodes when run-times exceed a threshold, in some cases sub-dividing the tasks and assigning the components to different nodes, to reduce the effect of onerous tasks and slow/overloaded nodes slowing down an iteration by the compute cluster.

Figure 2:
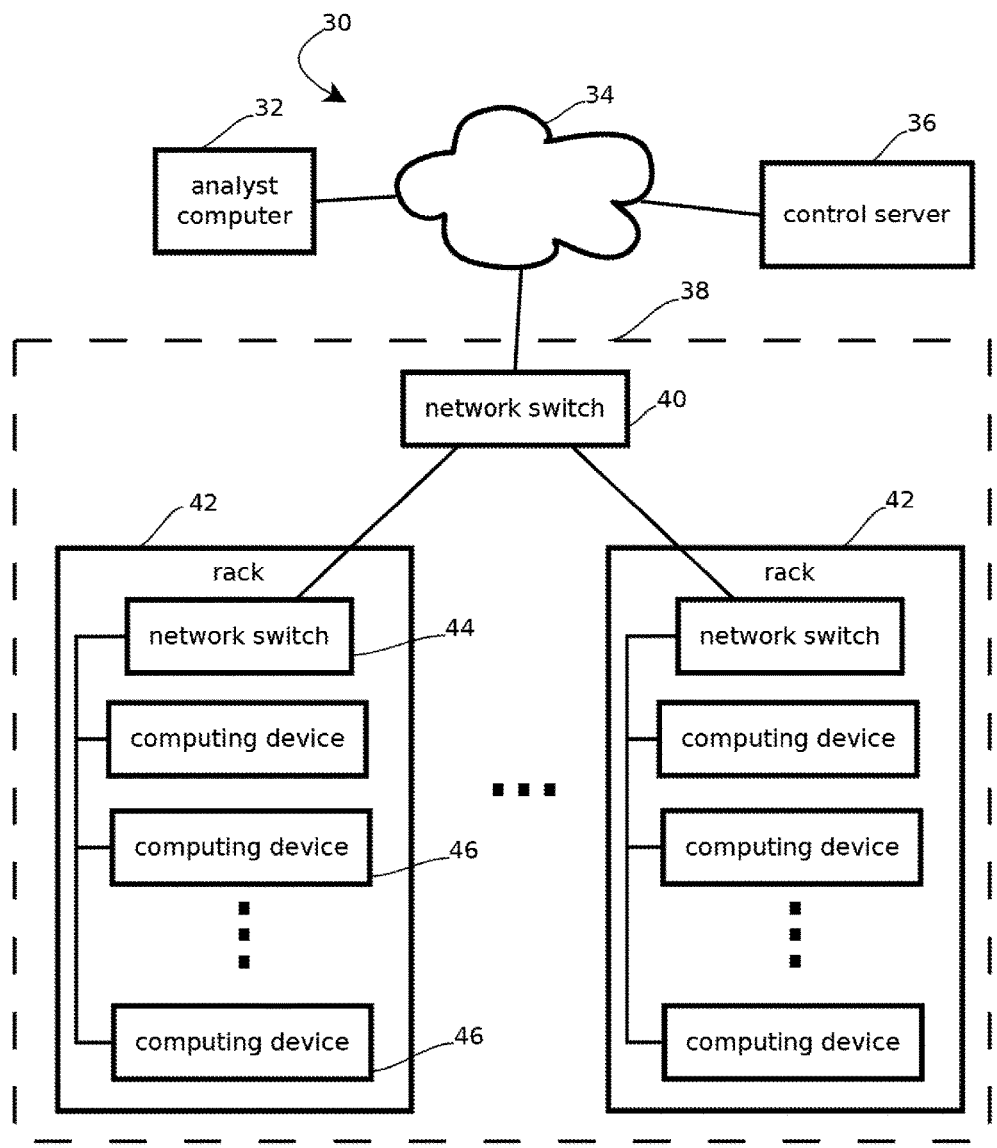
FIG. 2 is a block diagram of an example physical architecture of a system in accordance with the present techniques.

FIG. 2 depicts an example physical architecture by which the above techniques may be implemented. In some embodiments, the logical architecture of FIG. 1 may be implemented with a physical architecture presented in computing environment 30 of FIG. 2. This physical architecture is merely exemplary of computing substrates upon which the present functionality may be provided (which is not to suggest that other descriptions are limiting). That said, embodiments are expected to provide relatively fast results on relatively large data sets by using networked collections of computing devices, for example in a data center, to fill various roles, such as executing mapping functions, executing reducing functions, and storing data in a distributed file system.

In some embodiments, the computing environment 30 includes an analyst's computer 32, the Internet 34, a control server 36, and a data center or computing cluster 38. In some embodiments, the analysts computer 32 may be remote from the other components, along with the control server 36, or in some embodiments, the components 32, 36, and 38 may be co-located. In some embodiments, the analysts computer 32 may execute an operating system and an application through which an analyst submits scripts to analyze relatively large data sets, which may be resident elsewhere in environment 30 rather than on analysts computer 32 (e.g., in the various repositories described in the applications incorporated by reference). In some cases, the application may be a special-purpose application for data analysis, or in some embodiments, the application may be, for instance, a web browser that submits application program interface request to the control server 36 to effectuate analyses.

The control server 36 may implement the above-described parser 12, type checker 16, change detector 18, and input assembler 20 and instruct the computing cluster 38 to implement the evaluator 22 and storing modules 24 of FIG. 1. In some cases, the control server 36 may also be a computing device of the computing cluster 38. In operation, the analyst's computer 32 may submit scripts to the control server 36, which may instruct the computing cluster 38 to take responsive action. Results may be provided by the computing cluster 38 to the control server 36, which may format and send those results to the analyst's computer 32 via the Internet 34 for display.

In some embodiments, the computing cluster 38 may include a plurality of computers networked to one another on a local area network for relatively fast exchanges of relatively large amounts of data. In some embodiments, data sets may be in the range of petabytes or larger, and analyses may, in some cases, include substantial portions or all of such data sets. For instance, some embodiments may interrogate every time-tile of the sort described above covering the United States or the entire world to identify those time-tiles having certain attributes, for instance, scoring above a threshold value on some attribute. In other examples, some embodiments may interrogate every user profile for every user in, for example, the United States, or the entire world to identify those users having some combination of attributes. Performing these analyses on such large data sets with a single CPU executing a single threaded process is expected to be relatively slow compared to embodiments that parallelize those portions of the analysis amenable to concurrent operations.

In some embodiments, the computing cluster 38 may include a network switch 40 and a plurality of racks 42. In some embodiments, each rack 42 may be connected to each other rack 42 by the network switch 40, such that data and commands may be sent from one rack to any other rack directly through the network switch 40, in some cases. In some embodiments, each rack 42 may include a top-of-rack network switch 44 that routes signal sent to the rack 42 to or from selected ones of a plurality of rack-mounted computing devices 46.

In some embodiments, each computing device 46 may include one or more of the computing devices described below with reference to FIG. 4. In some embodiments, each computing device 46 may execute an operating system and application software for performing various roles within the architecture of FIG. 1. In some embodiments, such applications may execute within a virtual machine, such as the Java™ virtual machine on the respective computing devices 46. In some embodiments, some of those roles may include serving as master nodes (e.g., as a control server) that manage parallel operations on the other computing devices and direct the storage of data across those computing devices 46. Some computing devices 46 may serve the function of name nodes that further coordinate data access, and some computing devices 46 may serve the function of job trackers that coordinate the concurrent operations. In some embodiments, the bulk of the computing devices 46 may be worker nodes that store the data and execute the concurrent operations. To this end, some embodiments of the worker nodes may execute a task tracker and data node daemon that communicates with and receives directions from the master node.

Various numbers of computing devices 46 may be used, depending upon the data sets at issue, acceptable delay, and the resources available in each computing device. In some embodiments, the number of computing devices 46 may be greater than 64, for instance greater than 128, and in some cases approximately equal to 200, though these numbers are very problem and data set specific.

Figure 3:
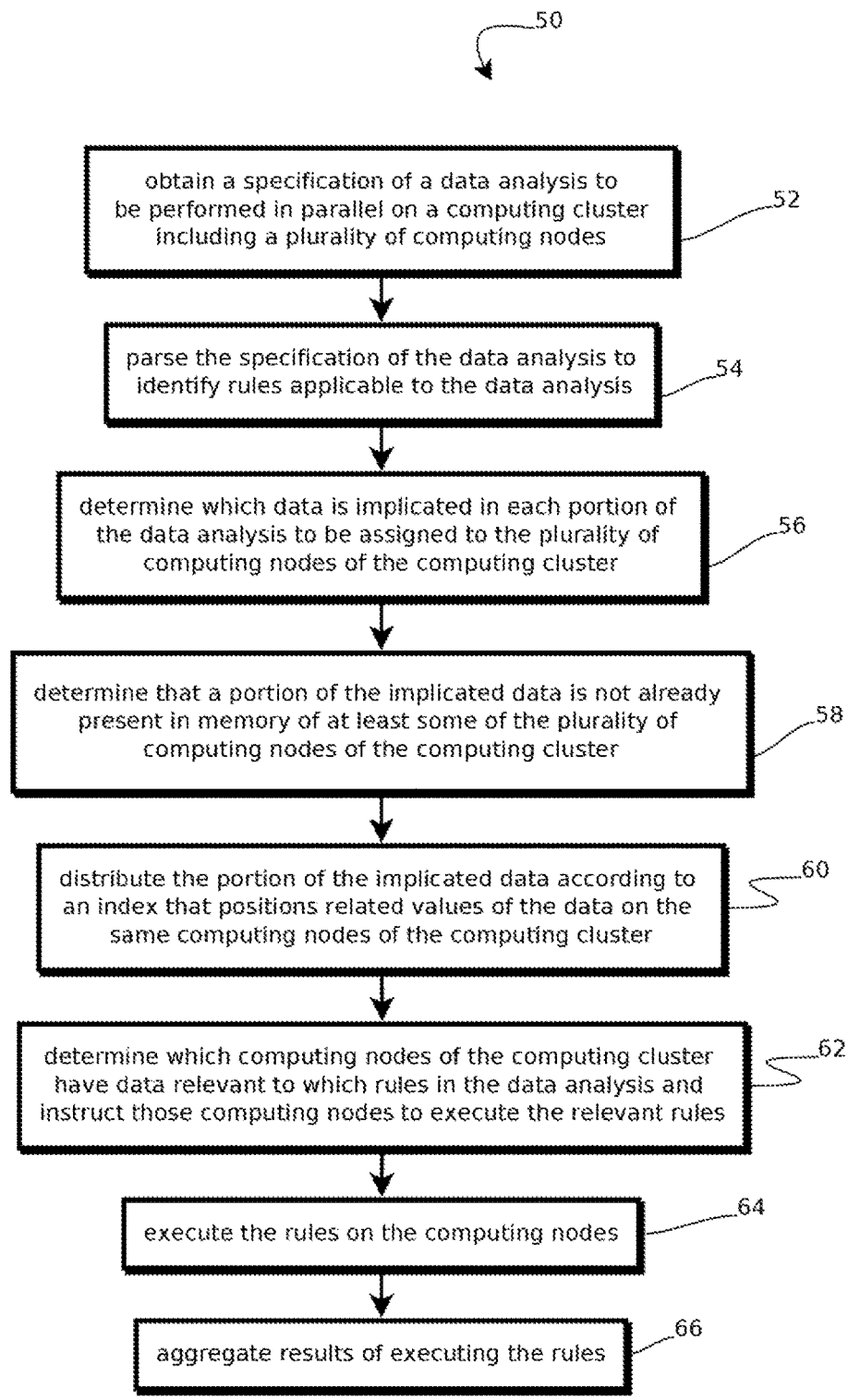
FIG. 3 is flow chart of a process that may be performed with the present techniques.

FIG. 3 depicts an example of a process 50 for executing scripted analyses on computing clusters. In some cases, the process of FIG. 3 may be performed by the above-described hardware. In some case, the process may be run in advance of usage of the data, as analyses may still be too slow for real-time responses, or some embodiments, may support real-time usage, for instance, by expediting analysis with the in-memory processing embodiments described above, e.g., to determine where to bid on advertisement slots.

In some embodiments, the process 50 includes obtaining a specification of a data analysis to be performed in parallel on a computing cluster including a plurality of computing nodes, as indicated by block 52. In some embodiments, the specification of the data analysis may be a script 14 provided by an analysts computer 32, as described above. In some cases, the script is expressed in a format suitable for data analysts who are unfamiliar with the intricacies of MapReduce or various analogous techniques for concurrent data analysis. In some embodiments, the script does not include explicit articulations of a mapping command or a reducing command intelligible to an underlying implementation of MapReduce, such as Hadoop, and these operations may be inferred from the scripting language instructions by other components to shield the data analyst from the complexity of the computations.

In some cases, scripts may be received as text files, as parameters of uniform resource locators (URLs,) or through other techniques. In some embodiments, the script may be interpreted or compiled at runtime and not before. In some cases, a command line interface may be provided, and individual lines of scripts may be entered by a user to manipulate program state line-by-line. Some scripts may be created with a wizard, such as a graphical user interface for selecting commands and parameters to specify a script. In some embodiments, data to be analyzed and related operations may be specified by dragging and dropping corresponding icons in such a wizard executing on the analyst computer.

Some embodiments may include parsing the specification of the data analysis to identify rules applicable to the data analysis, as indicated by block 54. In some embodiments, the step may be performed by the above-described parser 12, for instance, executed on the control server 36. In some embodiments, parsing may include creating an intermediate data structure, such as a parse tree, and then, some embodiments may translate the script or the parse tree into an abstract syntax tree. In some cases, nodes of the AST may represent programming constructs supported by the scripting language, such as "use," "using," "rule," "yield," "if/then," "while/do," and the like. In some cases, branches of the AST extending from nodes (which are not to be confused with computing nodes in a cluster) may represent conditional operations encoded in the script. In some cases, the rules may be a hierarchy of rules, with a top-level rule specifying an analysis to be formed, and several sub-rules under the top-level rule specifying operations in that analysis. In some cases, such rules may invoke other rules to pipeline analyses. In some embodiments, the rules are impetrative, or in some embodiments, the rules are built on functional programming constructs, e.g., without program state.

Next, some embodiments may determine which data is implicated in each portion of the data analysis to be assigned to a plurality of computing nodes of the computing cluster, as indicated by block 56. In some cases, this step may be performed by the above-describe control server 36 executing the change detector 18 and type checker 16. In some embodiments, the step may include recursively crawling the abstract syntax tree and identifying at each node data relevant to an operation represented by that node. For instance, some embodiments may crawl the abstract syntax tree and identify each node a set, such as a range, of index values, like locations or times or users, implicated by that operation. In some cases, the data may be distributed among a plurality of nodes, for instance with some of the computing devices 46 described above including a subset of the data, and other computing devices 46 including other subsets of the data.

Next, some embodiments may determine that a portion of the implicated data is not already present in memory (e.g., persistent storage or dynamic memory, for instance, in the address space of the operating system) of at least some of the plurality of computing nodes of the computing cluster, as indicated by block 58. In some embodiments, the step may be performed by the change detector 18 executed by the control server 36. In some embodiments, the control server 36 may maintain in memory an index of which information is stored on which of the computing devices 46, and that index may be interrogated to make the present determination. In other cases, an alternate determination may be reached, and the data implicated may already be present, in which case the subsequent step may be skipped, in response, which is not to imply that any other step or feature is not optional in at least some embodiments. Determining which data is implicated in each portion of the data analysis does not necessarily require that every portion of the data analysis be analyzed to identify every portion of data implicated, as some embodiments may identify some data implicated in some portions of the data analysis to execute the step.

Next, in response to step 58, some embodiments may distribute the portion of the implicated data according to an index that positions related data on the same computing nodes of the computing cluster, as indicated by block 60. In some embodiments, the step may be performed by the above-described input assembler 20, for instance, as executed by the control server 36 directing operations of the computing devices 46. In some cases, the implicated data may be the result of a previous analysis, with the result stored distributed among the computing devices 46 (also referred to as computing nodes, though in some cases, computing devices 46 may execute multiple virtual machines that may serve as multiple computing nodes on a single computing device 46).

Next, some embodiments may determine which computing nodes of the computing cluster have data relevant to which rules in the data analysis (which may include sub-rules of a higher-level rule) and instruct those computing nodes to execute the relevant rules, as indicated by block 62. In some cases, the control server 36 may instruct various computing devices 46 to execute a mapper routine to this end. In some cases, the data encoding the rules may be relatively small compared to the volume of data upon which the rules operate, like geographic data sets, or large sets of user profiles. Thus, sending the rules to the data, rather than sending the data to a computing device executing the rules is expected to be relatively fast. In some cases, all the rules in a given iteration may be sent to all of the computing nodes in a cluster, and computing nodes may be instructed to execute subsets of those rules relevant to data resident on those computing nodes.

Next, the computing nodes may execute the relevant rules, as indicated by block 64. In some cases, this may include a mapping operation performed by computing nodes executing on the computing devices 46 described above. In some embodiments, a rule may be mapped to (e.g., applied to) each of a plurality of items in a data set. For instance, each time-tile (or other value by which data is indexed) in a collection resident in memory of a computing node may be interrogated to ascertain whether attributes of that time-tile satisfies a criterion, producing a responsive subset of the time-tiles. In some cases, the mapping is functional rather than imperative. In some cases, the execution of the rules may be concurrent on each of a relatively large number of the computing devices, for instance more than 100, and different subsets of the data may be analyzed on different ones of the computing nodes, to expedite operations.

Next, some embodiments may aggregate the results of executing the rules, as indicated by block 66, e.g., by performing operations on responsive sub-sets identified in mapping operations. This step may also be performed by some or all of the computing devices 46 described above. In some cases, aggregation may include executing a reducing operation in parallel on the computing nodes on the results of the mapping operation. In some cases, aggregating the results may also include calculating various statistics on the results, such as counts, frequencies, measures of central tendency (like mean, median, or mode), measures of variation (like variance or standard deviation, or binning for histograms), or other types of curve fitting (like calculating best fit parameters for other distributions). In some embodiments, aggregating the results may further include preparing graphical representations of the results, like histograms, box plots, bar charts, pie charts, 2D Cartesian charts, 3-D charts, and the like. These results may be sent by the control server 36 to analyst computer 32 for viewing by the analyst. Or in some cases, rules may be pipelined, and the result of one analysis may be an input to a subsequent analysis.

Thus, some embodiments may make relatively powerful, highly concurrent computing clusters accessible to data analysts unskilled in the use of such hardware and software through the use of a scripting language. It would be a mistake, however, to oversimplify all of the inventions described herein by characterizing all described inventions at this relatively high level of abstraction. Various refinements on this idea solve meaningful and challenging problems that arise as this idea is implemented in commercially-relevant use cases. And some embodiments do not use scripted inputs, as some embodiments may expedite analyses written "closer to the metal" using the other techniques described herein.

It should be appreciated that computing clusters need not necessarily be co-located, as some embodiments may draw upon computing devices in multiple data centers, or upon collections of computing devices that are not in data centers or not on a shared local area network. Further, within a given computing device, data analysis may be parallelized, for example across cores, or within a graphical processing unit. In some cases, commands and data may be distributed by sending those commands or data on a network interface with address information sufficient to cause that information to arrive at a destination, without providing the network over which the data is conveyed. In some cases, the commands described herein may be executed by sending instructions to execute those commands to a computing device hosted by a third party, without the party "executing the commands" owning the hardware upon which the commands are implemented. Data storage can be similarly effectuated, without the party "storing the data" owning the hardware upon which the data is stored.

Many types of rules may be executed in the analysis. For instance, embodiments may identify every time-tile in which more than a threshold amount of people are present and more than a threshold amount of activity is exhibited, for instance, more than 500 people, more than a score of 7 for the attribute of tourism, less than a score of 3 for residential activity, during lunch time and afternoon hours. Or embodiments may identify all users who have a health tracking device (e.g., a fitness tracker, pulse oximeter, or portable electrocardiogram) indicating a problematic type of activity, like more than five anomalous events below a threshold in a trailing duration, or greater than a threshold frequency of some signal. Some embodiments may implement the analyses described in U.S. patent application Ser. No. 14/802,020, titled "ANALYZING MOBILE-DEVICE LOCATION HISTORIES TO CHARACTERIZE CONSUMER BEHAVIOR," filed 17 Jul. 2015, the entire contents of which are hereby incorporated by reference for all purposes.

As noted above, certain queries that may be processed with the above-described techniques perform relatively poorly as the complexity of the query increases and the amount of data over which the query is applied increases. These problematic queries often correspond to relatively intuitive and natural criteria by which an analyst may wish to classify user profiles.

Examples include certain types of queries that specify patterns in a time-series of observations of an individual's activities. For instance, queries that specify individuals who have engaged in A activity at least B times per C more than D times in an E repeated at least F times in duration G, where A represents an activity (like visiting a fast casual dining restaurant), B represent an integer amount (e.g., once) measured within C, C represents a frequency (like per day, or other bin of time), D represents an integer amount measured within E, E represents some duration of the pattern (like per week, or other span of time or delimiter), F represents an integer amount of repetitions of the preceding pattern measured during G, and G represents some duration of time over which the number of repetitions of the pattern are measured (like March 1 to June 27, or within the past three months). A more concrete example might be a query that includes a rule specifying individuals who have engaged in golf (e.g., at least been at a place associated with golf) at least once in a day at least two times in a week more than four times in the past 90 days. This formulation is relatively natural for humans to express a query for individuals, but particularly when combined with several such rules and applied over relatively large data sets, can be very computationally expensive. Some embodiments may execute these queries faster than traditional techniques using a greedy optimization algorithm and intermediate data structures designed to expedite operations.

In some cases, an analyst may submit a query requesting all user profiles that satisfy some criteria, with the criteria being expressed as rules. In some cases, the criteria specify a certain pattern of user behavior, and in some cases repetitions of that pattern selected to ensure the pattern is sufficiently representative of the individual's behavior. One example of such criteria includes the following example rule, which demonstrates one way in which such rules may be expressed by an analyst:

```
ruleb Beer_Coffee_Drinker {
    use time_interval from 60 days ago to now;
        Beer AND Coffee count>=3 in 1 week repeats 2 times;
}
```

The above-recited rule, in some embodiments, evaluates to true for a given individual in response to determining that that given individual has been seen at least three times a week twice at beer and coffee shop within the past 60 days. This rule can be decomposed into two sub problems: 1) a counting problem of determining whether there is a week in which beer is seen three times and coffee is seen three times; and 2) a repetition problem of determining whether the above counting problem evaluates to true on two separate occasions within the specified duration. In some embodiments, this rule may be relatively slow to test against relatively large data sets (e.g., exceeding more than 100 million records of activities of the individuals, for more than 10 million individuals) with relatively large numbers of users, and this problem is often exacerbated by relatively common use cases in which the query includes a relatively large number of such rules, e.g., in a Boolean expression combining the rules.

Part of the challenge arises from the use of sliding, unique windows of time for certain aspects of the queries. In the above example, the one-week duration may be satisfied by any seven consecutive days that are not part of a previous instance of the pattern, e.g., the week may start on a Thursday and extend through the following Wednesday, as long as not part of that seven day duration is part of a repetition of the pattern extending earlier than Thursday. As a result, there are often a relatively large number of permutations of dates and activities that potentially satisfy the rule, as a given instance of the activity may be applied to a pattern later in time or earlier in time, e.g., any of the seven unique overlapping one week spans of time overlapping the day with the activity. And the selection of one of those seven candidates may then affect which subsequent instances of the activity can constitute a repetition of the pattern, as pushing the week too far forward may obstruct another instance due to the requirement that the pattern instances not overlap. Further, in some cases, two or more activities may be specified (like in the example rule above), and some of these candidate permutations may satisfy one aspect of the rule while not satisfying the other.

The inventors have recognized that the above-described query rule presents a form of a combinatorial optimization problem. In this case, the problem has been recognized to be analogous to that presented in a relatively obscure form of combinatorial optimization problems referred to as the activity selection problem. Combinatorial optimization problems typically involve a relatively large search space (or at least one that scales poorly) that, in some cases, can be prohibitive to explore with naïve brute force techniques, for example, by trying every combination of dates and activities against the specified pattern.

Figure 4:
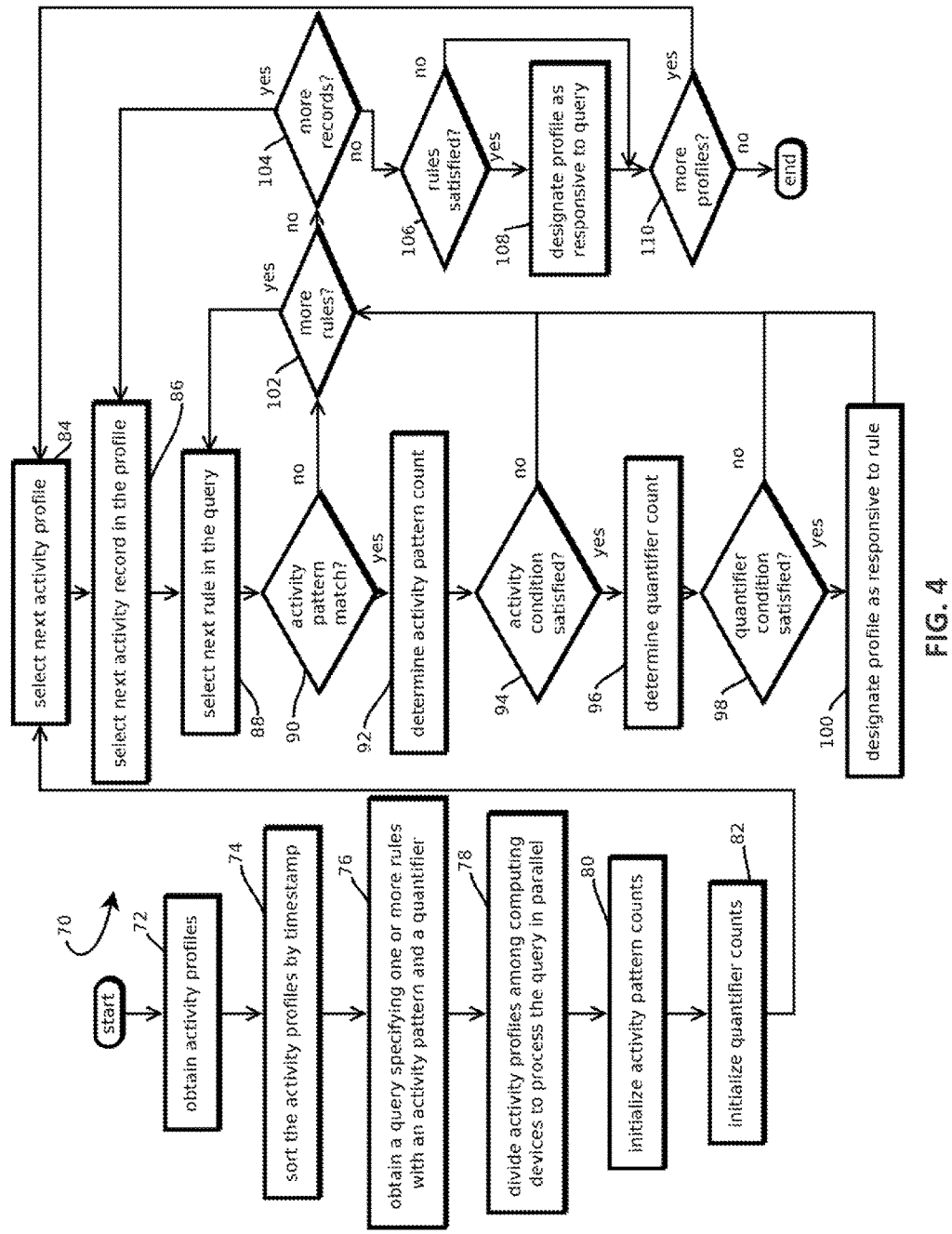
FIG. 4 is a flow chart of a process for expediting queries consistent with the present techniques.

FIG. 4 illustrates an example of a process 70 that is expected to be substantially faster than naïve brute force techniques for evaluating queries like those described above. In some embodiments, the process 70 may include preprocessing data to expedite certain aspects of the technique, forming intermediate data structures designed to expedite pattern detection, and then executing a greedy optimization algorithm that determines relatively quickly whether individuals have profiles responsive to even relatively complex queries. Further, some embodiments may parallelize portions of the process 70, analyzing relatively large numbers of user profiles concurrently on relatively large numbers of independent computing devices, for example, using some of the techniques described above with FIGS. 1 through 3.

In some embodiments, the process 70 includes obtaining activity profiles, as indicated by block 72. In some cases, the activity profiles each correspond to an individual user. In some embodiments, the activity profiles include the user profiles described in U.S. Pat. No. 8,489,596, the contents of which are hereby incorporated by reference. It is expected that the number of profiles will be relatively large, for example numbering well over 10,000, in some cases exceeding 1 million or 10 million, with many use cases exceeding 100 million. Further, it is expected that the activity profiles in many commercially relevant use cases will be relatively rich user profiles, for example including more than 10, and in many cases more than 100 or more than 1000 time stamped geolocation's of an individual user, with those geolocation's being associated with relatively detailed and granular descriptions of the geolocation's, such as the attributes in the time-tiles described in U.S. patent application Ser. No. 14/667,371, titled "LOCATION-BASED ANALYTIC PLATFORM AND METHODS," filed 24 Mar. 2015, which is incorporated by reference, and which may include similar attributes of places (e.g., defined by a bounding polygons) overlapping those tiles, like attributes of retail stores, restaurants, bars, parks, places of interest, and the like.

In some embodiments, each activity profile may include a relatively large number of activity records (e.g., more than 100), each activity record corresponding to a timestamped geolocation of the corresponding user and information about that geolocation. In some cases, an activity record represents when and where a user has been. One example of an activity record may take the following format:

```
record Activity {
    string source;
    string device_id;
    long timestamp;
    string geometry;
    union {null, map<string>} observation_metadata;
    string tile_id;
    int time_period;
    map<double> facet_to_score;
}
```

In some embodiments, the activity profiles may be consolidated, for example, by a grouping activity records on a day-by-day basis or according to some other frequency. In some cases, the grouping is according to a non-sliding window of time, like once per week, rather than during any consecutive 7 day period as might be used for pattern detection. The grouping interval may have any number of different frequencies depending on the granularity desired and tradeoffs in runtime and computing resource consumption, like a week by week or month by month basis. In some embodiments, consolidating may include removing duplicate activities within a cycle of the frequency, for example, removing two instances of an activity corresponding to getting coffee on a single day. This consolidation is expected to expedite processing by removing some of the data to be analyzed.

Next (which is not to imply here or throughout that embodiments are limited to the example sequence described), some embodiments may sort the activity profiles by timestamp value, as indicated by block 74. In some embodiments, the activity profiles may be sorted as a group by timestamp, or to expedite operations, activity profiles may be assigned to various different computing devices, and each of those computing devices may sort the activity profiles for a subset of the profiled users by timestamp. In some cases, the above-described MapReduce techniques may be used to sort the activity profiles on a plurality of different machines. Some embodiments may sort profiles individually, placing the activity records in a sequence indicated by their timestamps, or some embodiments may sort the collection of activity records for all of the activity profiles assigned to a given computing device. A variety of different sorting algorithms may be used to sort the activities, including comparison sorting algorithms and counting sorting algorithms. In some embodiments, sorting may be expedited by avoiding pairwise comparison between timestamps with a binning approach in which instances of a grouping frequency period are iterated, e.g., a day, and records are assigned to the day when their timestamp matches that day. For instance, the above consolidation and sorting steps may be merged with this technique. Or a variety of sorting algorithms may be used, including the following: Insertion sort, Selection sort, Merge sort, Heapsort, Quicksort, Bubble sort, Shell sort, Comb sort.

Next, some embodiments may obtain a query specifying one or more rules with an activity pattern and a quantifier, as indicated by block 76. One example of such a rule was given above. Another example of a rule referenced below follows: Beer OR Coffee count>=2 in 2 days repeats 2 times. The rule evaluates to true in the situations where beer is seen twice in two days, with two repetitions; beer is seen twice in two days and coffee is also seen twice in two days (i.e., two repetitions); and coffee is seen twice in two days with two repetitions. While evaluating the rules, some embodiments may keep track of the number of times beer has been seen within the two day interval and the number of times coffee is seen in the two day interval.

In some embodiments, a query includes one or more rules, in some cases with Boolean operators indicating how the rules are combined to determine whether the query evaluates to true or false for a given profile, such as an AND or OR operator combining rules. An example query might specify "rule X and (rule Y or rule Z)," for instance. Common use cases are expected to be substantially more complex, though.

In some embodiments, each rule includes an activity pattern, the activity pattern specifying in activity, and amount of instances of the activity, a relational operator, a frequency, and the duration. In some embodiments, the activity corresponds to an attribute of a place the user visited, as indicated by the user's location history. A variety of different types of activities may be specified, for example, activities in a taxonomy of activities, like restaurants→Italian restaurants→pizza places, or activities in a single level ontology, like playing golf, playing soccer, drinking coffee, commuting, shopping for groceries, and the like. The amount of instances of the activity may be the number of times the user is expected to have engaged in the activity within some duration of time for comparison based on the relational operator. For example, the amount may be more than three times at any point, more than some duration, on more than three days, on more than three weeks, or any other user-specified number of instances. As indicated, the instances may be grouped according to some frequency, such as day, or week, or month. The duration, in some embodiments, indicates the amount of consecutive time, and some cases on a unique rolling basis, over which the relational operator must evaluate to true for the pattern to be detected. For example, three visits to a dentist office over a six-month period would have a duration of six months and a relational operator of greater than or equal to. In some cases, the relational operator may be less than or equal to, less than, or greater than, or not equal to.

In some embodiments, each rule may further include a quantifier, the quantifier specifying an amount, another relational operator, and another duration. In some embodiments, the quantifier may specify an amount of repetitions of the activity pattern over some duration, such as specifying that the user must play soccer more than four times a week at least six times over in a week duration. In some cases, the relational operator can be any of the examples of relational operators listed above, and the duration may similarly specify a rolling start time and end time separated by some span (e.g., temporal delimiters). In some embodiments, the duration for the quantifier may be a fixed start time in a fixed in time, as well.

In some embodiments, the query may be a query submitted by an analyst researching user profiles, in which case query execution times on the order of five seconds or less are expected to be acceptable, with some use cases running longer, though generally less than one minute. In other use cases, the query execution time may be substantially longer, for example, as part of a batch process to construct an index of users to query results in advance of receiving queries. Or in some embodiments, the query may be executed in response to a request for content, and a response may be provided within less than 500 milliseconds (ms), for example within less than 200 ms, to avoid impairing the user's experience. For example, some advertising auctions are completed on the order of 100 ms, and some embodiments may execute a query sufficiently quickly that an entity has time to submit a bid based on the query result, e.g., whether the user who's device is requesting an ad is within a demographic responsive to a query.

Some embodiments may divide activity profiles among computing devices to process the query in parallel, as indicated by block 78. In some embodiments, the techniques described above with reference to FIGS. 1 through 3 may be used, and the query may be executed against different subsets of the activity profiles on different ones of the computing devices concurrently. In some embodiments, this is expected to substantially expedite operations relative to systems that perform the query on a single processor in a single thread. In some embodiments, steps 80 through 110 as described below may be performed concurrently on a relatively large number of computing devices with the activity profiles assigned to those computing devices in step 78. That said, embodiments are also consistent with simpler use cases, such as those that take longer.

Next, some embodiments may initialize activity pattern counts, as indicated by block 80, and initialize quantifier counts, as indicated by block 82. In some cases, the counts are each an individual variable representing an accumulated count over some trailing duration, or in some embodiments, the counts may be encoded in a more complex data structure that affords faster processing. For instance, in some embodiments, the counts are encoded in a mapping of days (or other instances of a grouping frequency) to activities and counts of those activities, like Day 1—[Beer,2], [Coffee,1], Day 2—[Coffee,1], etc. Some embodiments may prune this mapping once the span exceeds the duration of the activity pattern to conserve memory and expedite interrogation of the data structure. In some cases, instantiating the counts entails defining an empty array or dictionary, like a dictionary of activity/count pairs. In some embodiments, an activity pattern count and quantifier count may be instantiated for each activity profile and for each rule being evaluated against the activity profile. Thus, a relatively large number of activity pattern counts and quantifier counts may be instantiated and initialized. In some embodiments, initialization include setting the activity pattern counts to zero or to some value from which activity pattern counts and quantifier counts will count down.

Next, some embodiments may select a next activity profile, as indicated by block 84. For example, in some embodiments, the next activity profile may be selected arbitrarily or based on a position of the activity profile in an array or other data structure of activity profiles.

Next, some embodiments may select a next activity record in the respective profile selected in step 84, as indicated by block 86. In some embodiments, as noted above, the activity records are sorted by time, for example, in order of increasing time, with an earliest activity record listed first. In some cases, selecting the next activity record include selecting the first activity record in the sorted list or selecting a next activity record after one previously processed.

Next, some embodiments may select a next rule in the query, as indicated by block 88. In some embodiments, the rules may be selected arbitrarily from a set of rules constituting a query, or based on some sequence in which the rules are encoded, or in some embodiments, rules may be selected according to in order of operation of a Boolean specification within the query, for example, favoring AND terms over OR terms and favoring parentheses over everything. In some embodiments, selecting a next rule may include determining whether a result for a previous rule indicates the next rule cannot have an effect on the outcome of the query for the respective profile, for example, determining whether one branch of an AND statement has already evaluated to false and, in response, determining to not evaluate the next rule. Again, this technique is expected to expedite operations over systems that naïvely apply rules, though embodiments are also consistent with slower techniques.

Next, some embodiments may determine whether an activity pattern of the rule matches the activity record. In some embodiments, a match occurs when a criteria specified in the activity pattern is satisfied, such as the user has engaged in a particular activity specified by the rule or a class of activity specified by the rule.

Next, in response to determining that the activity pattern matches, some embodiments may determine an activity pattern count for that respective rule (and in some cases for a particular activity of the rule, for example where some rules have multiple activities) for that profile and for that repetition being tracked, as indicated by block 92. In some cases, a mapping of frequency periods to activity values like that described above may be accessed to increment a count through the mapping, or some embodiments may decrement a count instead of incrementing, for example, systems in which the count is set at some threshold value, and embodiments count down to zero to determine when the threshold is met. For instance, some embodiments may iterate through each of seven trailing days in a dictionary like that described above and count each time an activity implicated by the rule occurs, e.g., each time beer occurs and each time coffee occurs to determine two counts. Further, in some embodiments, the data structure containing the mapping may be updated to reflect whether the current iteration contains the activity (e.g., by appending a value of the activity associated with a value indicating whether (or how many times) the activity was performed) and to trim values from the mapping that are older than the activity pattern duration.

Next, some embodiments may determine whether an activity condition is satisfied, as indicated by block 94. In some cases, determining whether the activity condition is satisfied includes determining whether in amount of instances of the activity (grouped based on the specified frequency, for example daily) satisfies the relational operator within the scope of the temporal duration specified in the activity pattern. For example, whether the user has visited a coffee shop more than three times within one week. In some cases, determining whether the activity condition is satisfied may include calculating the count over the trailing duration specified by the activity pattern.

In response to determining the activity condition is satisfied, some embodiments may determine a quantifier count, as indicated by block 96. Some embodiments may maintain a sorted list of instances of repetitions within the quantifier duration, and some embodiments may determine the count by counting instances in the list. Again, counts may be incremented or decremented in some embodiments, for example, counting down from some threshold to zero. In some cases, incrementing the quantifier count includes determining whether the current activity record falls within a direction duration specified for the quantifier or recalculating account over a trailing instance of the duration. Further, in some embodiments, a data structure mapping instances of repetitions to the time at which the repetition occurred may be updated to reflect whether the current iteration contains a repetition (e.g., by appending an identifier of the repetition associated with a value indicating whether (or how many times) the repetition was occurred) and to trim values from the mapping that are older than the quantifier duration.

Next, some embodiments may determine whether a quantifier condition is satisfied, as indicated by block 98. In some embodiments, the step may include determining whether an amount of repetitions of the activity pattern satisfy a relational operator over the specified duration of the quantifier. For example, some embodiments may determine whether the pattern of visiting a coffee shop at least three times in one week has occurred more than six times over the previous nine months.

Upon determining that the quantifier condition is satisfied, some embodiments may designate the respective profile as responsive to the rule being evaluated. Thus, some embodiments may favor the first instance in a time series in which the pattern and rule are satisfied over other candidate arrangements. In this sense, the technique can be described as implementing a greedy approach, favoring a current iteration rather than exploring all possible permutations. Greedy techniques are expected to be optimal or close to optimal in terms of conserving computational resources, as similar techniques have worked well for solving the activity selection problem in other domains (which is not to suggest that use of a greedy algorithm is the only innovative aspect of the present implementation). Then, some embodiments may proceed to block 102 to determine whether more rules remain to be evaluated within the query. Some embodiments may also reach block 102 upon determining that the activity condition is not satisfied in block 94, or upon determining that quantifier condition is not satisfied in block 98.

Upon determining that the query contains more rules that have not yet been evaluated, some embodiments may return to block 88 and repeat the above-described steps.

Alternatively, upon determining that the query does not contain more rules, some embodiments may proceed to block 104 and determine whether more records are present within the individual profile at issue, as indicated by block 104. Thus, some embodiments may apply each rule to an individual activity record of an individual profile before advancing to the next activity record of that profile. This is expected to reduce movement of data between storage and RAM and between RAM and higher levels of cache memory in a CPU and, thereby, reduce cache misses and expedite operations. The time taken to retrieve data from storage can be over 100 times longer than the time taken to retrieve the data from L2 cache, for example.

Upon determining that more records are present in the profile, some embodiments may return to block 86, and repeat the above-described operations. Alternatively, upon determining that there are no more records for the individual profile, some embodiments may proceed to block 106 and determine whether the rules of the query are satisfied. In some cases, this may include retrieving records indicating which rules the profile was designated as being responsive to and comparing those values against a Boolean combination of the rules to evaluate the query, such as a requirement that either one rule or another must evaluate to true or a requirement that each of seventeen different rules must all evaluate to true. Upon determining that the rules are satisfied, some embodiments may designate the profile as responsive to the query, as indicated by block 108.

Either way the process exits 106, some embodiments may determine whether more profiles remained to be evaluated, as indicated by block 110. In some cases, upon determining that more profiles remained to be evaluated, some embodiments may return to step 84 and select the next activity profile. Then, some embodiments may repeat the above-described steps. Alternatively, some embodiments may complete the process 70 and, in some cases, return a set, such as a list, of responsive user profiles, like unique identifiers of user profiles.

In some cases, content may be distributed (e.g., selected for transmission by another system, or selected and transmitted) based on the responsive user profiles. For example, in response to receiving a request for content, like an ad request, some embodiments may determine whether the ad request is associated with a user identifier previously identified as responsive to a query, or identified as responsive to a query in real time, and content may be selected in response, for example, content designated to be sent to users in a particular group. In another example, content may be selected by determining an amount and whether to bid in an ad auction based on whether the ad auction is associated with a user that is responsive to a query, either a preprocessed query or a real-time query, depending upon the embodiment. In another example, distributing content may include selecting literature or other printed content to be mailed to the user based on whether the user is responsive to the query. In some embodiments, selecting content may include recommending content to the user, such as music, movies, books, or product materials, and the like based on whether the user is responsive to the query.

Figure 5:
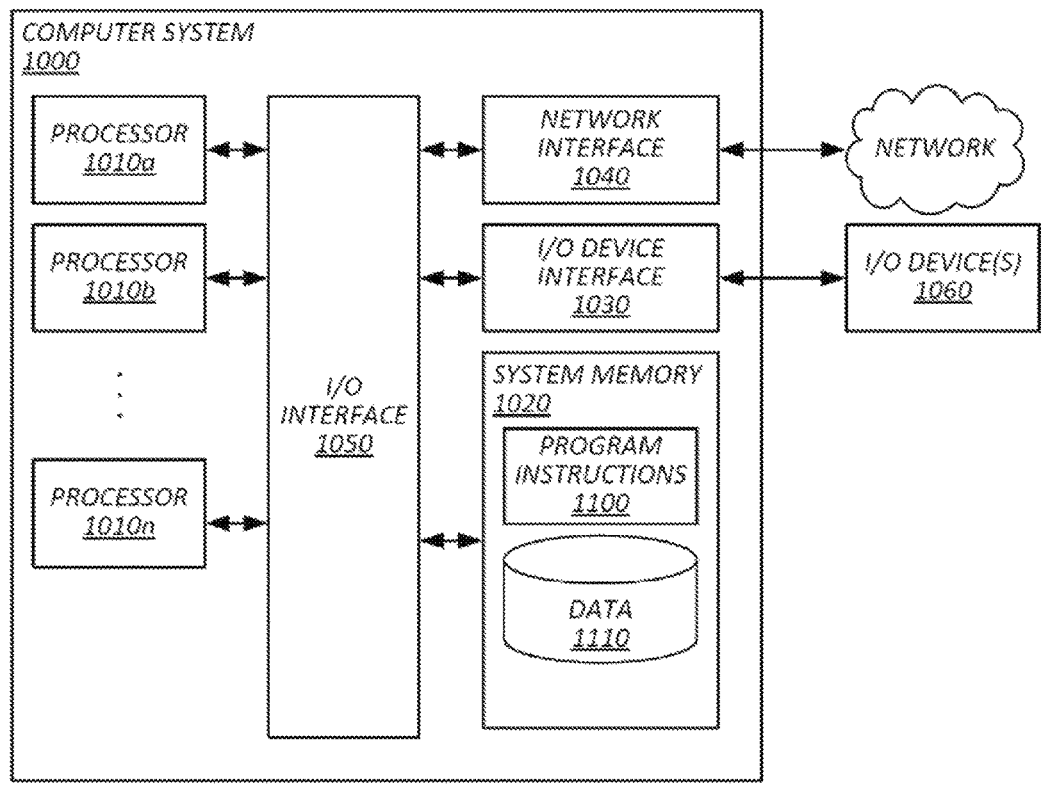
FIG. 5 shows an example of a computer with which the present techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehiclemounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method, comprising: obtaining activity profiles of more than 10,000 individuals, each activity profile corresponding to a respective individual, and each activity profile including a plurality of activity records, each activity record indicating a geolocation, a timestamp indicating when the individual was at the geolocation, and an attribute of the geolocation other than geospatial or temporal attributes, the activity profiles being based, at least in part, on network traffic generated by the individuals with respective mobile computing devices; for each activity profile, sorting the activity records in order of the timestamps to form respective sorted activity profiles; obtaining a query having a rule specifying criteria to select a subset of the individuals, the criteria comprising: an activity pattern comprising an activity, an amount of instances of the activity, a first relational operator, and a pattern duration of time over which the activity pattern is evaluated to determine whether the amount of instances of the activity satisfy a first condition specified by the first relational operator; and a quantifier comprising an amount of instances of the activity pattern, a second relational operator, and a quantifier duration of time over which the quantifier is evaluated to determine whether the amount of instances of the activity pattern satisfies a second condition specified by the second relational operator; for each sorted activity profile, with one or more processors: initializing an activity pattern count; initializing a quantifier count; iterating through the sorted activity records in sorted order and at each iteration: determining whether the attribute of the geolocation of the respective activity record matches the activity of the activity pattern and, in response to determining a match: determining the activity pattern count; determining whether the activity pattern count satisfies the first condition and, in response to determining that the first condition is satisfied: initializing the activity pattern count; determining the quantifier count; and determining whether the quantifier count satisfies the second condition and, in response to determining that the second condition is satisfied, designating the individual corresponding to the respective sorted activity profile as responsive to the query.
2. The method of embodiment 1, comprising: assigning different subsets of the 10,000 or more individuals to more than five computers; and concurrently, for each of the subsets, determining, with the respective computer, which individuals are responsive to the query.
3. The method of any of embodiments 1-2, wherein the query has a plurality of rules, and wherein the method comprises concurrently or consecutively evaluating each of the rules for each iteration through the sorted activity records before advancing to a next iteration.
4. The method of any of embodiments 1-3, wherein the query has more than 10 rules, and wherein the method comprises: assigning different subsets of the 10,000 or more individuals to 20 or more computers; and concurrently, for each of the subsets, determining, with the respective computers, which individuals are responsive to the query, wherein determining which individuals are responsive to the query comprises concurrently or consecutively evaluating each of the rules for each iteration through the sorted activity records before advancing to a next iteration on a given computer among the 20 or more computers.
5. The method of any of embodiments 1-4, wherein the activity of the activity pattern comprises a plurality of facets of geolocations in a geographic information system, and wherein a plurality of activity pattern counts corresponding to the plurality of facets are maintained when iterating through the sorted activity records.
6. The method of embodiment 5, comprising: while iterating through the sorted activity records, updating a mapping of the timestamps within a given instance of the pattern duration to activity pattern count and activity pairs.
7. The method of any of embodiments 5-6, comprising: while iterating through the sorted activity records, updating a mapping of the plurality of facets to respective activity pattern counts.
8. The method of any of embodiments 5-7, comprising: while iterating through the sorted activity records, updating a mapping of the plurality of facets to respective ones of a plurality of quantifier counts.
9. The method of any of embodiments 1-8, wherein the activity pattern comprises a frequency, and wherein respective activity pattern counts are adjusted once or less within each cycle of the frequency.
10. The method of any of embodiments 1-9, comprising performing steps for selecting content based on the query response.
11. A tangible, non-transitory, machine-readable medium storing instructions that when executed by a data processing apparatus cause the data processing apparatus to perform operations comprising: the operation of any of embodiments 1-10.
12. A system, comprising:
one or more processors; and
memory storing instructions that when executed by the processors cause the processors to effectuate operations comprising: the operation of any of embodiments 1-10.

What is claimed is:
1. A method, comprising:
obtaining activity profiles of more than 10,000 individuals, each activity profile corresponding to a respective individual, and each activity profile including a plural- ity of activity records, each activity record indicating a geolocation, a timestamp indicating when the individual was at the geolocation, and an attribute of the geolocation other than geospatial or temporal attributes, the activity profiles being based, at least in part, on network traffic generated by the individuals with respective mobile computing devices;

for each activity profile, sorting the activity records in order of the timestamps to form respective sorted activity profiles;

obtaining a query having a rule specifying criteria to select a subset of the individuals, the criteria comprising:
- an activity pattern comprising an activity, an amount of instances of the activity, a first relational operator, and a pattern duration of time over which the activity pattern is evaluated to determine whether the amount of instances of the activity satisfy a first condition specified by the first relational operator; and
- a quantifier comprising an amount of instances of the activity pattern, a second relational operator, and a quantifier duration of time over which the quantifier is evaluated to determine whether the amount of instances of the activity pattern satisfies a second condition specified by the second relational operator;

for each sorted activity profile, with one or more processors:
- initializing an activity pattern count;
- initializing a quantifier count;
- iterating through the sorted activity records in sorted order and at each iteration:
  - determining whether the attribute of the geolocation of the respective activity record matches the activity of the activity pattern and, in response to determining a match:
    - determining the activity pattern count;
    - determining whether the activity pattern count satisfies the first condition and, in response to determining that the first condition is satisfied:
      - initializing the activity pattern count;
      - determining the quantifier count; and
      - determining whether the quantifier count satisfies the second condition and, in response to determining that the second condition is satisfied, designating the individual corresponding to the respective sorted activity profile as responsive to the query.

2. The method of claim 1, comprising:
assigning different subsets of the 10,000 or more individuals to more than five computers; and
concurrently, for each of the subsets, determining, with the respective computer, which individuals are responsive to the query.

3. The method of claim 1, wherein the query has a plurality of rules, and wherein the method comprises concurrently or consecutively evaluating each of the rules for each iteration through the sorted activity records before advancing to a next iteration.

4. The method of claim 1, wherein the query has more than 10 rules, and wherein the method comprises:
assigning different subsets of the 10,000 or more individuals to 20 or more computers; and
concurrently, for each of the subsets, determining, with the respective computers, which individuals are responsive to the query, wherein determining which individuals are responsive to the query comprises concurrently or consecutively evaluating each of the rules for each iteration through the sorted activity records before advancing to a next iteration on a given computer among the 20 or more computers.

5. The method of claim 1, wherein the activity of the activity pattern comprises a plurality of facets of geolocations in a geographic information system, and wherein a plurality of activity pattern counts corresponding to the plurality of facets are maintained when iterating through the sorted activity records.

6. The method of claim 5, comprising:
while iterating through the sorted activity records, updating a mapping of the timestamps within a given instance of the pattern duration to activity pattern count and activity pairs.

7. The method of claim 5, comprising:
while iterating through the sorted activity records, updating a mapping of the plurality of facets to respective activity pattern counts.

8. The method of claim 5, comprising:
while iterating through the sorted activity records, updating a mapping of the plurality of facets to respective ones of a plurality of quantifier counts.

9. The method of claim 1, wherein the activity pattern comprises a frequency, and wherein respective activity pattern counts are adjusted once or less within each cycle of the frequency.

10. The method of claim 1, comprising performing steps for selecting content based on the query response.

11. A tangible, machine-readable, non-transitory media storing instructions that when executed by one or more computing devices effectuate operations comprising:
obtaining activity profiles of more than 10,000 individuals, each activity profile corresponding to a respective individual, and each activity profile including a plurality of activity records, each activity record indicating a geolocation, a timestamp indicating when the individual was at the geolocation, and an attribute of the geolocation other than geospatial or temporal attributes, the activity profiles being based, at least in part, on network traffic generated by the individuals with respective mobile computing devices;

for each activity profile, sorting the activity records in order of the timestamps to form respective sorted activity profiles;

obtaining a query having a rule specifying criteria to select a subset of the individuals, the criteria comprising:
- an activity pattern comprising an activity, an amount of instances of the activity, a first relational operator, and a pattern duration of time over which the activity pattern is evaluated to determine whether the amount of instances of the activity satisfy a first condition specified by the first relational operator; and
- a quantifier comprising an amount of instances of the activity pattern, a second relational operator, and a quantifier duration of time over which the quantifier is evaluated to determine whether the amount of instances of the activity pattern satisfies a second condition specified by the second relational operator;

for each sorted activity profile:
- initializing an activity pattern count;
- initializing a quantifier count;
- iterating through the sorted activity records in sorted order and at each iteration:

determining whether the attribute of the geolocation of the respective activity record matches the activity of the activity pattern and, in response to determining a match:
  determining the activity pattern count;
  determining whether the activity pattern count satisfies the first condition and, in response to determining that the first condition is satisfied:
    initializing the activity pattern count;
    determining the quantifier count; and
    determining whether the quantifier count satisfies the second condition and, in response to determining that the second condition is satisfied, designating the individual corresponding to the respective sorted activity profile as responsive to the query.

12. The media of claim 11, the operations comprising:
  assigning different subsets of the 10,000 or more individuals to more than five computers; and
  concurrently, for each of the subsets, determining, with the respective computer, which individuals are responsive to the query.

13. The media of claim 11, wherein the query has a plurality of rules, and wherein the method comprises concurrently or consecutively evaluating each of the rules for each iteration through the sorted activity records before advancing to a next iteration.

14. The media of claim 11, wherein the query has more than 10 rules, and wherein the operations comprise:
  assigning different subsets of the 10,000 or more individuals to 20 or more computers; and
  concurrently, for each of the subsets, determining, with the respective computers, which individuals are responsive to the query, wherein determining which individuals are responsive to the query comprises concurrently or consecutively evaluating each of the rules for each iteration through the sorted activity records before advancing to a next iteration on a given computer among the 20 or more computers.

15. The media of claim 11, wherein the activity of the activity pattern comprises a plurality of facets of geolocations in a geographic information system, and wherein a plurality of activity pattern counts corresponding to the plurality of facets are maintained when iterating through the sorted activity records.

16. The media of claim 15, the operations comprising:
  while iterating through the sorted activity records, updating a mapping of the timestamps within a given instance of the pattern duration to activity pattern count and activity pairs.

17. The media of claim 15, the operations comprising:
  while iterating through the sorted activity records, updating a mapping of the plurality of facets to respective activity pattern counts.

18. The media of claim 15, the operations comprising:
  while iterating through the sorted activity records, updating a mapping of the plurality of facets to respective ones of a plurality of quantifier counts.

19. The media of claim 11, wherein the activity pattern comprises a frequency, and wherein respective activity pattern counts are adjusted once or less within each cycle of the frequency.

20. The media of claim 11, the operations comprising performing steps for selecting content based on the query response.

* * * * *